(12) United States Patent
Kishimoto et al.

(10) Patent No.: US 7,484,367 B2
(45) Date of Patent: Feb. 3, 2009

(54) DEFECT DETERMINING DEVICE FOR TURBO CHARGER

(75) Inventors: Gaku Kishimoto, Nagoya (JP); Minoru Toyoshima, Kariya (JP); Seigaku Tanizawa, Kariya (JP)

(73) Assignees: Toyota Jidosha Kabushiki Kaisha, Toyota-shi (JP); Kabushiki Kaisha Toyota Jidoshokki, Kariya-shi (JP)

( * ) Notice: Subject to any disclaimer, the term of this patent is extended or adjusted under 35 U.S.C. 154(b) by 186 days.

(21) Appl. No.: 11/399,439

(22) Filed: Apr. 7, 2006

(65) Prior Publication Data

US 2006/0225418 A1 Oct. 12, 2006

(30) Foreign Application Priority Data

Apr. 8, 2005 (JP) ............... 2005-112831

(51) Int. Cl.
*F02D 23/00* (2006.01)
*F02B 37/12* (2006.01)

(52) U.S. Cl. ...................................... 60/602

(58) Field of Classification Search ........... 60/600–603, 60/605.1
See application file for complete search history.

(56) References Cited

U.S. PATENT DOCUMENTS

| 4,671,067 | A | * | 6/1987 | Abo et al. | 60/602 |
| 4,848,086 | A | * | 7/1989 | Inoue et al. | 60/602 |
| 5,031,406 | A | * | 7/1991 | Akiyama | 60/602 |
| 5,174,119 | A | * | 12/1992 | Hanauer et al. | 60/602 |
| 5,526,266 | A | * | 6/1996 | Rutan et al. | 60/605.1 |
| 5,590,630 | A | * | 1/1997 | Kurihara et al. | 123/339.17 |
| 6,202,412 | B1 | | 3/2001 | Lange et al. | 60/602 |
| 6,279,551 | B1 | * | 8/2001 | Iwano et al. | 123/564 |
| 6,314,737 | B1 | | 11/2001 | Springer et al. | 60/602 |
| 6,425,247 | B1 | | 7/2002 | Schmid | 60/602 |
| 6,681,573 | B2 | * | 1/2004 | Arnold | 60/602 |
| 2006/0123782 | A1 | * | 6/2006 | Rosin et al. | 60/600 |
| 2006/0248889 | A1 | * | 11/2006 | Sagisaka et al. | 60/602 |

FOREIGN PATENT DOCUMENTS

| FR | 2 856 738 | | 12/2004 |
| JP | 10-196381 | | 7/1998 |
| JP | 11-62604 | | 3/1999 |
| JP | 2006291815 A | * | 10/2006 |

* cited by examiner

*Primary Examiner*—Thai-Ba Trieu
(74) *Attorney, Agent, or Firm*—Oblon, Spivak, McClelland, Maier & Neustadt, P.C.

(57) ABSTRACT

An ECU (electronic control unit) determines whether a turbo charger is defective or not based on degree of deviation between a target boost pressure Pimtrg and an actual boost pressure Pim of the turbo charger. Further, ECU estimates exhaust gas pressure of an exhaust passage from the internal combustion engine to the turbo charger based on a state of engine operation, and determines whether or not the estimated exhaust gas pressure is relatively low. When it is determined that the exhaust gas pressure is relatively low, the manner of defect determination is changed such that the determination of defect is not readily made.

29 Claims, 5 Drawing Sheets

DEFECT DETERMINING DEVICE FOR TURBO CHARGER

This nonprovisional application is based on Japanese Patent Application No. 2005-112831 filed with the Japan Patent Office on Apr. 8, 2005, the entire contents of which are hereby incorporated by reference.

BACKGROUND OF THE INVENTION

1. Field of the Invention

The present invention relates to a defect determining device for determining a defect of a turbo charger having a boost pressure changing mechanism, which allows change in boost pressure in accordance with the state of operation of an internal combustion engine.

2. Description of the Background Art

A turbo charger utilizing exhaust gas pressure has been widely known as a super-charging system for forced feeding of intake air to the combustion chamber of the internal combustion engine, to attain higher charging efficiency. In the turbo charger, it is desirable to appropriately adjust the boost pressure in accordance with the state of operation of the internal combustion engine. To meet this demand, a turbo charger has been practically used, which includes a variable nozzle provided in a passage of supplying the exhaust gas to the turbine wheel to change the cross-sectional area of the passage, and in which flow and velocity of the exhaust gas blowing into the turbine wheel are adjusted by changing the open position of the variable nozzle.

In the turbo charger having such a boost pressure changing mechanism, a target boost pressure is set in accordance with the state of operation of the engine, and the open position of variable nozzle is changed so that the actual boost pressure matches the target boost pressure. As a result, the actual boost pressure of the turbo charger can be changed to a value suitable for the state of operation of the engine.

In the turbo charger of this type, if the function of changing boost pressure were degraded because of sticking of variable nozzle, for example, it would be difficult to appropriately control the boost pressure in accordance with the state of operation of the engine. Therefore, a degree of deviation between the target boost pressure and the actual boost pressure is monitored, and when the degree of deviation becomes large, it is determined that the boost pressure changing mechanism of the turbo charger is defective, and necessary measures are taken to address the defect. An example of such a device that determines the defect of turbo charger is proposed in Japanese Patent Laying-Open No. 10-196381.

In a turbo charger including a boost pressure changing mechanism, the following defective situation may arise. Specifically, when the variable nozzle is in a closed state with the flow and velocity of exhaust gas blowing into the turbine wheel being large and the nozzle should undesirably be stuck in this state, the boost pressure changing mechanism fails to operate with the degree of supercharging attained by the mechanism kept relatively large. In such a defective situation, the flow and velocity of exhaust gas flowing to the turbine wheel would be unnecessarily large, and the exhaust gas pressure in the exhaust passage from the combustion chamber of the engine to the turbo charger would also increase. Consequently, the increased exhaust gas pressure may cause damage on pipes of the exhaust system, or may undesirably open the exhaust valve, possibly leading to leakage of exhaust gas back to the combustion chamber of the engine. Therefore, it is desirable to determine and address such a defective situation as soon as possible.

The determination of any defect of the turbo charger based simply on the degree of deviation between the target and actual boost pressures, however, may result in the following problem. Specifically, assume that the target boost pressure changes significantly along with the change in the state of operation of the engine. In such a situation, the actual boost pressure may not follow the change in target boost pressure fast enough, due to delayed response, for example, of the boost pressure changing mechanism. In that case, though the boost pressure changing mechanism is not defective and the actual boost pressure would eventually converge to the target pressure, the temporal deviation leads to an erroneous determination that the mechanism is defective. In order to avoid such an erroneous determination, it may be possible to determine any defect if the state where there is a deviation between the actual and target pressures continues for a prescribed time period. It is noted, however, that the time necessary for the actual boost pressure to converge to the target pressure differs dependent on the amount of change in the target boost pressure or aging degradation that may affect response of the boost pressure changing mechanism. Therefore, in this method, it is necessary to set the prescribed time period a little longer, expecting such difference.

SUMMARY OF THE INVENTION

The present invention was made in view of the foregoing, and its object is to provide a defect determining device for a turbo charger that can immediately determine a defect of excessive increase in exhaust gas pressure in an exhaust passage between the internal combustion engine and the turbo charger, while preventing erroneous determination.

In the following, measures to attain the above-described object and functions and effects thereof will be described.

The present invention provides a defect determining device for determining a defect of a turbo charger including a boost pressure changing mechanism allowing change in boost pressure in accordance with a state of operation of an internal combustion engine, including: a defect determining unit determining that the turbo charger is defective, based on a degree of deviation between a target boost pressure and an actual boost pressure of the turbo charger; an exhaust gas pressure determining unit estimating exhaust gas pressure of an exhaust passage from the internal combustion engine to the turbo charger based on a state of operation of the engine, and determining that the estimated exhaust gas pressure is relatively low; and a changing unit changing a manner of the defect determination such that the determination of any defect is not readily made when the exhaust gas pressure is determined to be relatively low by the exhaust gas pressure determining unit.

In this arrangement, the exhaust gas pressure in the exhaust passage from the internal combustion engine to the turbo charger is estimated from the state of operation of the engine, and if the estimated exhaust gas pressure is relatively low, the manner of defect determination is changed such that the determination of any defect is not readily made even when the actual boost pressure exceeds the target boost pressure. Therefore, if the exhaust gas pressure is low and the possibility of any damage on a pipe of the exhaust system is low, the manner of defect determination is changed to make the defect determination less likely. On the other hand, if the exhaust gas pressure increases, such a change is not made, and the defect is determined in a normal manner. Therefore, by this arrangement, the defect causing excessive increase in exhaust gas pressure resulting, for example, from a failure of the boost pressure changing mechanism with the degree of supercharging kept relatively large, can be determined immediately while erroneous determination is prevented.

In the foregoing, "the determination of any defect is not readily made" means both the state in which the determination of defect is not made, that is, defect determination is prohibited, and the state in which the defect determination is not prohibited but made less frequently.

The exhaust gas pressure from the internal combustion engine to the turbo charger tends to be higher as the actual boost pressure (intake pressure) has been made higher by the supercharging function by the turbo charger. In this regard, preferably, the exhaust gas pressure determining unit determines that the exhaust gas pressure is relatively low, when the actual boost pressure is equal to or lower than a predetermined boost pressure determining value and the actual boost pressure is relatively low. By this arrangement, the exhaust gas pressure can be estimated with high accuracy, and reliability of defect determination can be improved.

When the actual boost pressure is high and the engine speed further increases, basically, the flow rate of exhaust gas discharged from the internal combustion engine increases accordingly. Therefore, the exhaust gas pressure in the exhaust passage between the internal combustion engine and the turbo charger also increases accordingly. In this regard, more preferably, the exhaust gas pressure determining unit sets the boost pressure determining value to be smaller when engine speed attains (or is) higher. Therefore, by this arrangement, the exhaust gas pressure can be estimated with high accuracy, and reliability of defect determination can be improved.

When the amount of fuel injection increases, the combustion pressure of the engine increases, and the amount of intake air taken to the combustion chamber of the engine also increases. As a result, the exhaust gas pressure of the exhaust passage from the internal combustion engine to the turbo charger also becomes higher. In this regard, more preferably, the exhaust gas pressure determining unit determines that the exhaust gas pressure is relatively low, when amount of fuel injection is equal to or lower than a predetermined fuel injection amount determining value and the amount of fuel injection is relatively small. Therefore, by this arrangement, the exhaust gas pressure can be estimated with high accuracy, and reliability of defect determination can be improved.

When the condition that the actual boost pressure is equal to or lower than a prescribed boost pressure determining value, and the condition that the amount of fuel injection is equal to or smaller than a prescribed fuel injection amount determining value are both satisfied, it may be determined that the exhaust gas pressure is relatively low. In order to avoid erroneous determination appropriately, it is desirable to change the manner of determination such that when at least one of these conditions is satisfied, the defect determination is not readily made, assuming that exhaust gas pressure is relatively low.

When the amount of fuel injection is high and the engine speed further increases, basically, the flow rate of exhaust gas discharged from the internal combustion engine increases accordingly. Therefore, the exhaust gas pressure in the exhaust passage between the internal combustion engine and the turbo charger also increases accordingly. In this regard, more preferably, the exhaust gas pressure determining unit sets the fuel injection amount determining value to be smaller when engine speed attains higher. Therefore, by this arrangement, the exhaust gas pressure can be estimated with high accuracy, and reliability of defect determination can be improved.

When the amount of intake air (amount of intake air supplied to the internal combustion engine per unit time) increases, the amount of intake air taken to the combustion chamber of the engine for combustion also increases. As a result, the exhaust gas pressure in the exhaust passage between the internal combustion engine and the turbo charger also increases accordingly. In this regard, preferably, the exhaust gas pressure determining unit determines that the exhaust gas pressure is relatively low, when amount of intake air is equal to or lower than a predetermined intake air amount determining value and the amount of intake air is relatively small. Therefore, by this arrangement, the exhaust gas pressure can be estimated with high accuracy, and reliability of defect determination can be improved.

When the condition that the actual boost pressure is equal to or lower than a prescribed boost pressure determining value, the condition that the amount of fuel injection is equal to or smaller than a prescribed fuel injection amount determining value and the condition that the amount of intake air is equal to or smaller than a prescribed intake air amount determining value are all satisfied, it may be determined that the exhaust gas pressure is relatively low. In order to avoid erroneous determination appropriately, it is desirable to change the manner of determination such that when at least one of these conditions is satisfied, the defect determination is not readily made, assuming that that exhaust gas pressure is relatively low.

When the intake air amount is large and the engine speed decreases, the amount of intake air taken to the combustion chamber of the engine per one engine combustion increases, and therefore, compression ratio increases and exhaust gas pressure in the exhaust passage between the internal combustion engine and the turbo charger also increases accordingly. In this regard, preferably, the exhaust gas pressure determining unit sets the intake air amount determining value to be larger when engine speed attains higher. Therefore, by this arrangement, the exhaust gas pressure can be estimated with high accuracy, and reliability of defect determination can be improved.

As described above, when the boost pressure changing mechanism fails to operate with the degree of supercharging thereof kept relatively large, the flow and velocity of the exhaust gas blowing into the turbine wheel are increased more than necessary, and therefore, excessive increase in exhaust gas pressure in the exhaust passage between the internal combustion engine and the turbo charger becomes more likely. In this regard, more preferably, relation among an engine speed, the actual boost pressure, an amount of fuel injection and an amount of intake air when degree of supercharging attained by the boost pressure changing mechanism is fixed at the maximum is stored in advance, and whether or not the exhaust gas pressure is relatively low is determined based on the relation and the engine speed. Therefore, by this arrangement, whether or not the exhaust gas pressure increases to an excessively high state because of failure of the boost pressure changing mechanism with the degree of supercharging being relatively high is determined, and if it is not such a state but the exhaust gas pressure is relatively low, the manner of defect determination is changed such that defect determination is not readily made. As a result, erroneous determination of the turbo charger can appropriately be avoided.

As to the specific manner of determining whether or not the exhaust gas pressure increases to an excessively high state because of failure of the boost pressure changing mechanism with the degree of supercharging being relatively high, preferably, the storage unit stores functions for calculating a boost pressure determining value, a fuel injection amount determining value and an intake air amount determining value, respectively, with the engine speed being an independent variable; and the exhaust gas pressure determining unit determines that the exhaust gas pressure is relatively low, when any of conditions that the actual boost pressure is equal to or lower than the boost pressure determining value, an amount of fuel injection is equal to or lower than the fuel injection amount determining value, and an amount of intake air is equal to or lower than the intake air amount determining value is satisfied.

When the actual boost pressure is high and further the engine speed increases, basically, the flow rate of exhaust gas discharged from the internal combustion engine increases accordingly. Therefore, the exhaust gas pressure in the exhaust passage between the internal combustion engine and the turbo charger also increases accordingly. In this regard, more preferably, the boost pressure determining value is set to be smaller when the engine speed attains higher. Therefore, by this arrangement, the exhaust gas pressure can be estimated with high accuracy, and reliability of defect determination can be improved.

When the amount of fuel injection is large and further the engine speed increases, basically, the flow rate of exhaust gas discharged from the internal combustion engine increases accordingly. Therefore, the exhaust gas pressure in the exhaust passage between the internal combustion engine and the turbo charger also increases accordingly. In this regard, more preferably, the fuel injection amount determining value is set to be smaller when the engine speed attains higher. Therefore, by this arrangement, the exhaust gas pressure can be estimated with high accuracy, and reliability of defect determination can be improved.

When the intake air amount is large and the engine speed decreases, the amount of intake air taken to the combustion chamber of the engine per one engine combustion increases, and therefore, compression ratio increases and exhaust gas pressure in the exhaust passage between the internal combustion engine and the turbo charger also increases accordingly. In this regard, preferably, the intake air amount determining value is set to be larger when the engine speed attains higher. Therefore, by this arrangement, the exhaust gas pressure can be estimated with high accuracy, and reliability of defect determination can be improved.

More preferably, as the change of the manner of defect determination made by the changing unit to make defect determination less likely, the reference for determination (deviation determining value) used when the defect determination is made based on the degree of deviation between the target and actual boost pressures may be changed to a larger value (larger deviation), or defect determination may be prohibited.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention applied to a defect determining device for a turbo charger in a diesel engine for a vehicle will be described with reference to FIGS. 1 to 5.

Figure 1:
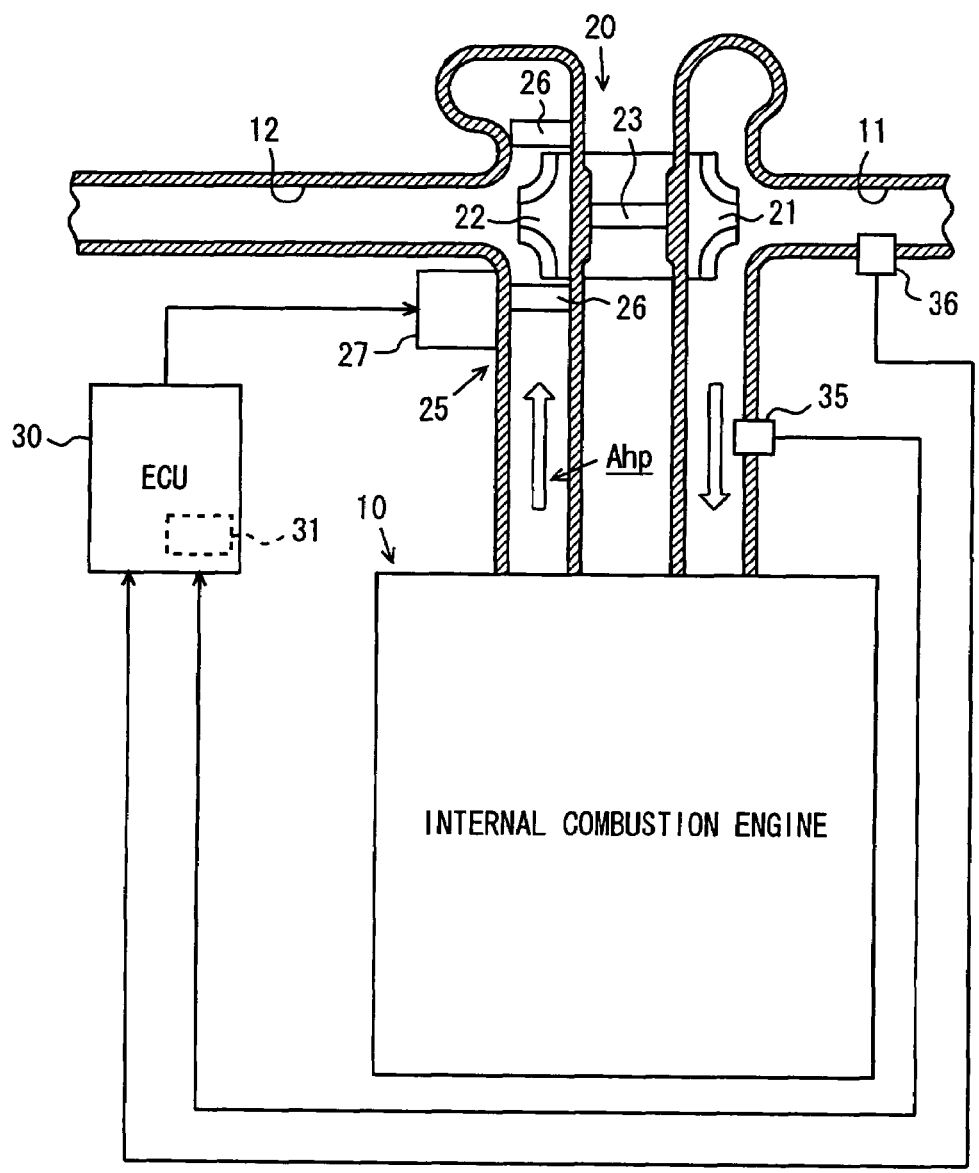
FIG. 1 is a schematic diagram showing an internal combustion engine and intake/exhaust systems thereof, in accordance with an embodiment of the present invention.

FIG. 1 shows a diesel engine to which a turbo charger is mounted, and intake/exhaust system configurations thereof. As can be seen from the figure, to the diesel engine (hereinafter simply referred to as an engine) 10, an intake passage 11 and an exhaust passage 12 are connected. Intake air introduced through intake passage 11 to a combustion chamber, not shown, of engine 10 is used for combustion of fuel in the chamber, and a gas generated by combustion goes out as an exhaust gas to exhaust passage 12.

In the middle of intake passage 11 and exhaust passage 12, a turbo charger 20 is provided, for super-charging intake air to the engine combustion chamber utilizing pressure of the exhaust gas (exhaust gas pressure). Turbo charger 20 includes a compressor wheel 21 for pressurizing intake air to be introduced to the engine combustion chamber, and a turbine wheel 22 that rotates upon receiving the exhaust gas pressure coming out from the chamber. Compressor wheel 21 and turbine wheel 22 are coupled to rotate integrally by a rotor shaft, so that rotation of turbine wheel 22 is transmitted through rotor shaft 23 to compressor wheel 21.

Turbo charger 20 includes a boost pressure changing mechanism 25 for changing boost pressure of intake air to be introduced to the combustion chamber. For changing the flow and velocity of exhaust gas that rotates and drives turbine wheel 22, boost pressure changing mechanism 25 includes a variable nozzle 26 that can change cross sectional area of exhaust passage 12 on the upstream side of turbine wheel 22 and an actuator 27 for displacing the variable nozzle.

Degree of supercharging by boost pressure changing mechanism 25 (supercharging degree) is the smallest when the open position of variable nozzle 26 (nozzle open position) Na is the largest of the variable range, that is, on the full open side. On the other hand, the nozzle open position Na when the supercharging degree attains the highest is set to a value smaller than the largest open position, that is, a value close to the fully closed side. The nozzle open position Na is adjusted through drive control of actuator 27 by an ECU (Electronic Control Unit) 30.

ECU executes overall control of engine 10 including fuel injection control, and it includes an operating unit, driving circuits and a memory 31 storing results of operations related to various control, a function map used for the operations and so on. ECU calculates an amount of fuel injection Q of an injector, not shown, for supplying fuel to the combustion chamber based on an accelerator position and the like, and based on the calculated amount of fuel injection Q and state of operation of the engine including engine speed Ne, calculates a target value of boost pressure (target boost pressure) Pimtrg. ECU 30 performs feedback control on actuator 27 such that the actual value of boost pressure (actual boost pressure) Pim detected by a boost pressure sensor 35 provided downstream of compressor wheel 21 in intake passage 11 attains the target boost pressure Pimtrg.

In intake passage 11, an intake air amount sensor 36 for detecting an amount of intake air (amount of intake air supplied to internal combustion engine 10 per unit time) Ga is provided upstream of compressor wheel 21.

In turbo charger 20 having boost pressure changing mechanism 25, when the boost pressure changing function lowers as variable nozzle 26 is stuck, for example, it becomes difficult to appropriately control the boost pressure in accordance with the state of engine operation. Particularly when variable nozzle 26 should be stuck with the supercharging degree of boost pressure changing mechanism set at the maximum, exhaust gas pressure Pe of the area from the combustion chamber to turbo charger 20 (area Ahp in FIG. 1) of exhaust passage 12 would become excessively high, causing significant decrease in durability of components forming the passage 12.

Therefore, in the present embodiment, degree of deviation between the target boost pressure Pimtrg and actual boost pressure Pim is monitored, and when the degree of deviation becomes large, it is determined that the boost pressure changing mechanism 25 is defective, and an indication to that effect is given on an indicator provided in the vehicle interior.

When the defect determination of turbo charger 20 is performed based on the degree of deviation only, an erroneous determination may be made because of delayed response of boost pressure changing mechanism 25 when target boost pressure Pimtrg lowers abruptly, and if the time of determination is set longer to prevent such an erroneous determination, defect determination might be delayed.

In view of the foregoing, in the present embodiment, the manner of defect determination is changed in accordance with the state of engine operation, in order to prevent such problems. Specifically, from the viewpoint of maintaining high durability of components forming exhaust passage 12, the manner of defect determination is changed to avoid as much as possible a determination that boost pressure changing mechanism is defective, as long as the exhaust gas pressure Pe of area Aha of passage 12 does not become excessively high.

Figure 2:
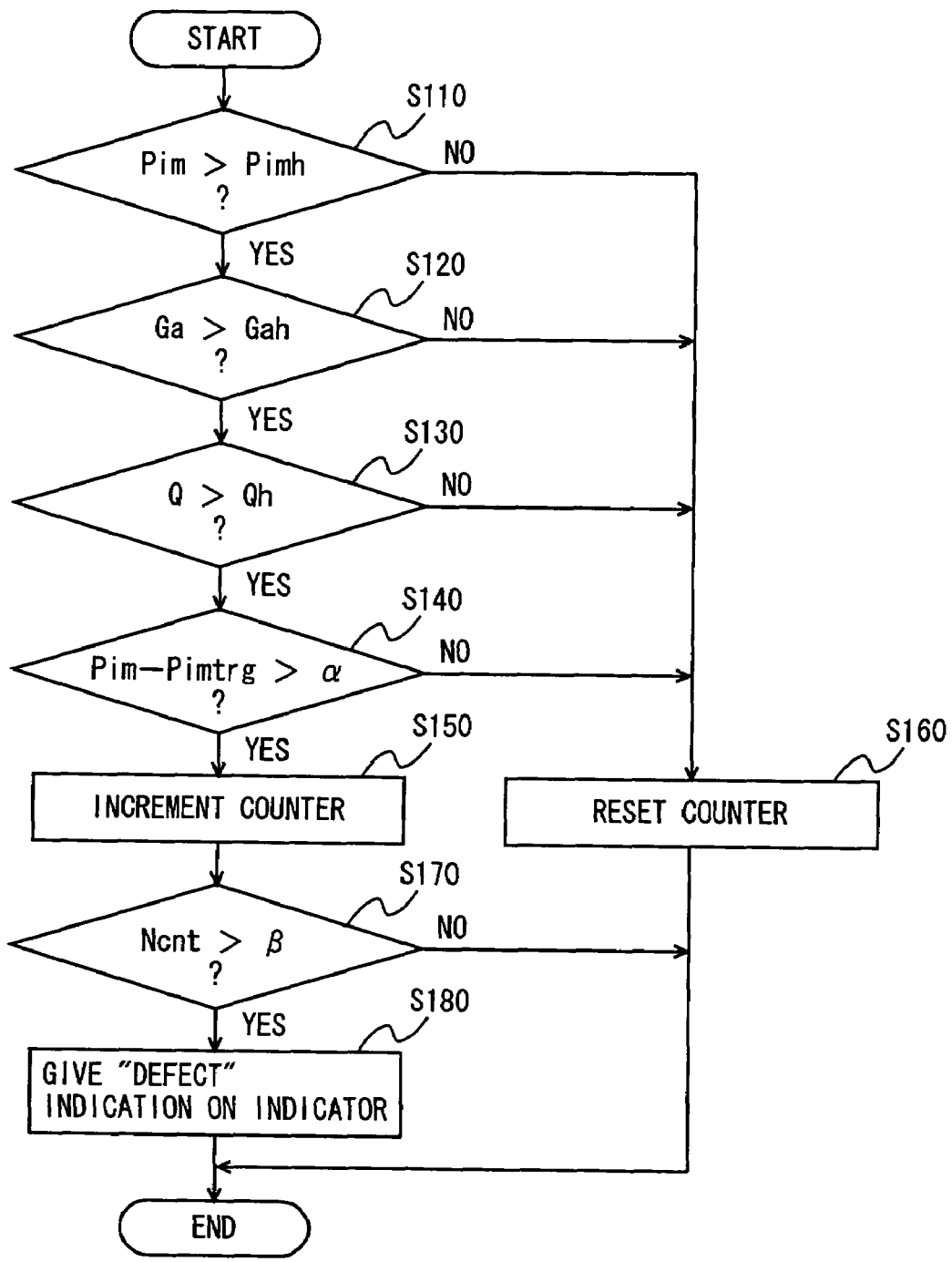
FIG. 2 is a flowchart related to a process for determining defect of a turbo charger.
Figure 3:
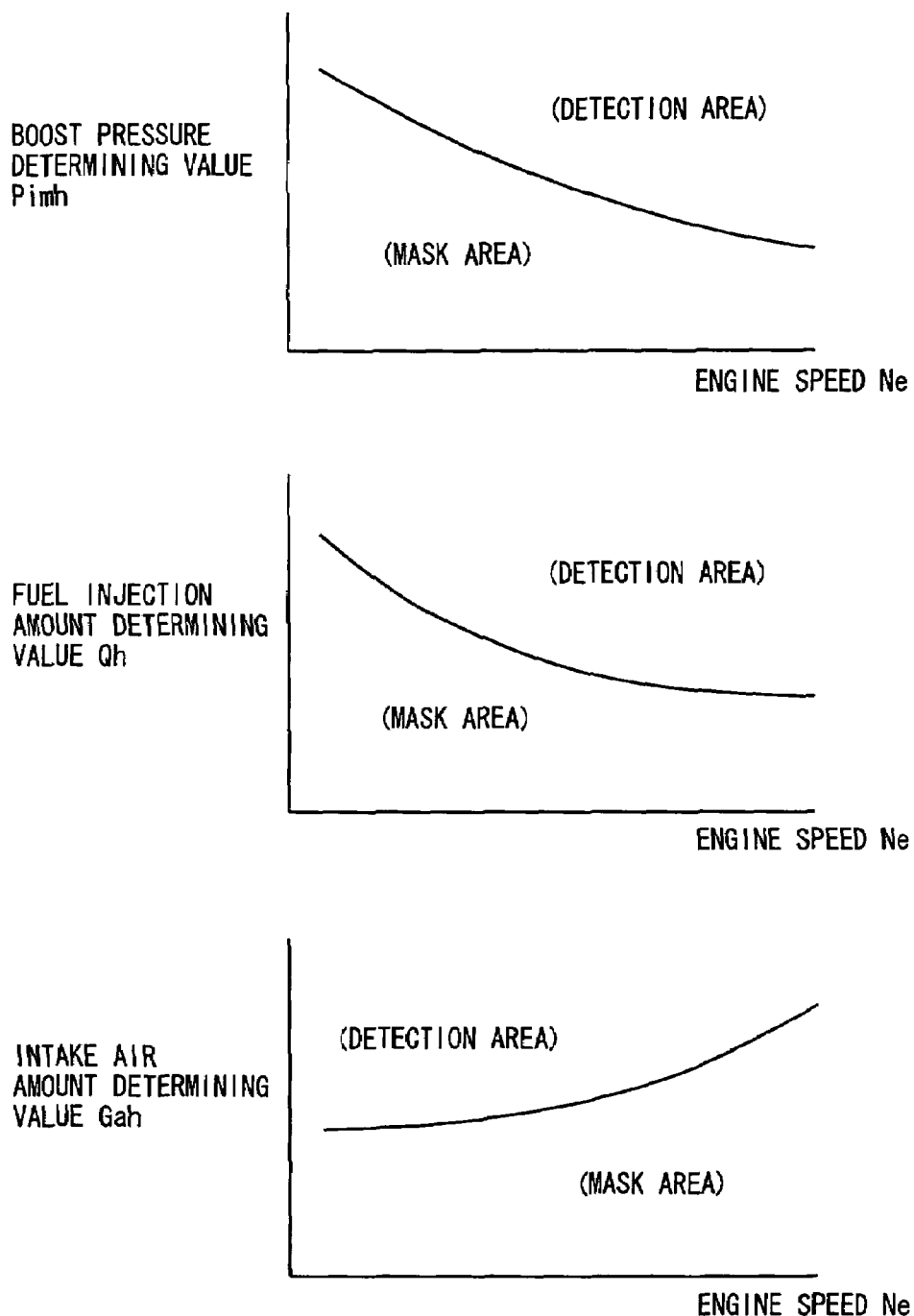
FIG. 3 includes maps of function representing relation between engine speed and each of boost pressure determining value, fuel injection amount determining value and intake air amount determining value.
Figure 4:
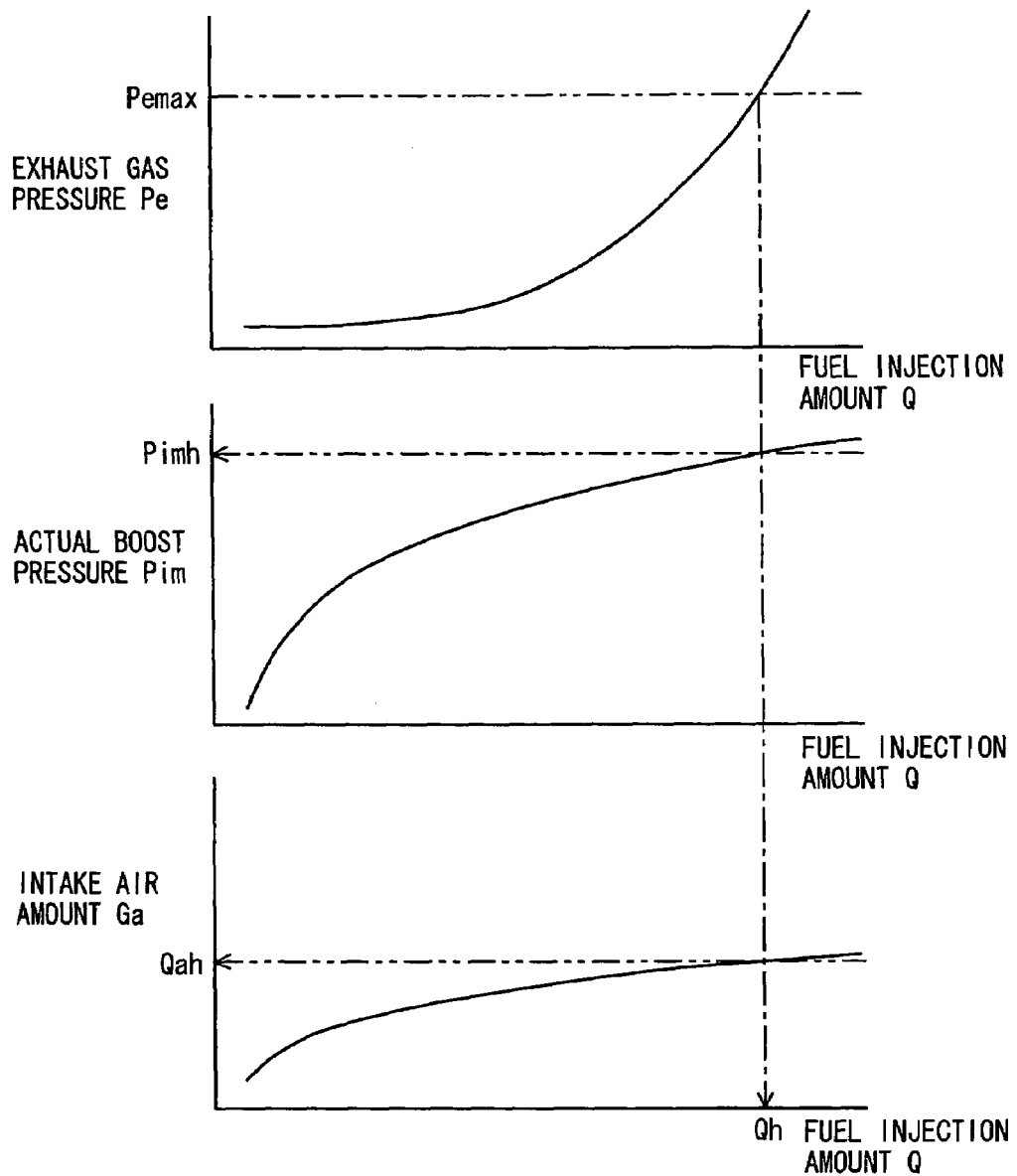
FIG. 4 includes graphs representing relation among boost pressure determining value, fuel injection amount determining value and intake air amount determining value.

In the following, the defect determining control routine of turbo charger 20 executed by ECU 30 will be described in greater detail, with reference to the flowchart of FIG. 2. The routine is executed in an interrupting manner at every predetermined time period.

In the defect determining process, ECU 30 repeatedly executes determination as to whether the degree of deviation between the target boost pressure Pimtrg and actual boost pressure Pim is larger than a predetermined deviation determining value or not. When the determination that the degree of deviation is larger than the deviation determining value is made consecutively and the number of such consecutive determination exceeds a predetermined determination value, it is determined that boost pressure changing mechanism 25 is defective and an indication to that effect is given on the indicator.

Further, in the present embodiment, conditions are set to execute the determination as to whether the degree of deviation is larger than the deviation determining value or not, so that the defect determination of boost pressure changing mechanism 25 is not readily made. Here, the conditions for execution are set such that the determination is executed only when the exhaust gas pressure Pe exceeds maximum tolerable pressure Pemax. The maximum tolerable pressure Pemax is set as the exhaust gas pressure Pe that is the highest tolerable pressure from the viewpoint of maintaining high durability of components forming exhaust passage 12. Specifically, the present control routine is to avoid as much as possible the determination that boost pressure changing mechanism 25 is defective, while maintaining the durability.

In the present control routine, steps S110, S120 and S130 correspond to the execution conditions. Specifically, in step S110, whether the actual boost pressure Pim is higher than a predetermined boost pressure determining value Pimh or not is determined. Only if the result of determination is YES, that is, only if the actual boost pressure Pim is higher than the boost pressure determining value Pimh, the flow proceeds to step S120, allowing further process to step S140. Here, the boost pressure determining value Pimh is set to maintain high durability of components, and it is set considering that the durability is better maintained when the result of determination is NO, that is, when the actual boost pressure Pim is equal to or lower than the boost pressure determining value Pimh.

The process of step S140 is related to the determination as to whether the degree of deviation between the actual boost pressure Pim and the target boost pressure Pimtrg is larger than a predetermined value or not. Here, the degree of deviation is determined by the determination as to whether the difference obtained by subtracting the target boost pressure Pimtrg from the actual boost pressure Pim is larger than a predetermined deviation determining value $\alpha$ ($\alpha>0$) or not. If the result of determination in step S140 is YES, that is, if it is determined that the degree of deviation between the actual boost pressure Pim and the target boost pressure Pimtrg is larger than a predetermined value, the flow proceeds to step S150, and a counter value Ncnt of a counter provided in ECU 30 is incremented.

In step S120, whether the amount of intake air Ga is larger than a predetermined intake air amount determining value Gah or not is determined, and only if the result of determination is YES, that is, only if the amount of intake air Ga is larger than the intake air amount determining value Gah, the process proceeds to step S130, allowing further process to step S140. Here, the intake air amount determining value Gah is set to maintain high durability of components, and it is set considering that the durability is better maintained when the result of determination is NO, that is, when the amount of intake air Ga is equal to or smaller than the intake air amount determining value Gah.

In the next step S130, whether the amount of fuel injection Q is larger than a predetermined fuel injection amount determining value Qh or not is determined, and when the result of determination is YES, that is, when the amount of fuel injection Q is larger than the fuel injection amount determining value Qh, the flow proceeds to step S140. Here, the fuel injection amount determining value Qh is set to maintain high durability of components, and it is set considering that the durability is better maintained when the result of determination is NO, that is, when the amount of fuel injection Q is equal to or smaller than the fuel injection amount determining value Qh.

In the present control routine, if any of the determinations of steps S110, S120, S130 and S140 is NO, the process of step S150, that is, increment of counter value Ncnt is prohibited, and the counter is reset (step S160).

Specifically, such control is naturally done if it is determined that the degree of deviation is equal to or lower than the deviation determining value a in step S140 (result of determination: NO), and even when the degree of deviation is higher than the 15 deviation determining value $\alpha$, execution of step S140 itself is prohibited if any of the determinations in steps S110, S120 and S130 is NO.

It is noted that the exhaust gas pressure Pe in area Ahp of exhaust passage 12 tends to be higher as the actual boost pressure Pim is made higher by the supercharging function of turbo charger 20. Further, the determination "NO" in the process of step S110 means that the actual boost pressure Pim is not higher than the boost pressure determining value Pimh. Therefore, in the present embodiment, based on this determination of "NO", it is determined that the exhaust gas pressure Pe is relatively low. As it is determined that the exhaust gas pressure Pe is relatively low, increment of counter value Ncnt is prohibited and the counter is reset.

When the amount of intake air Ga increases, the amount of intake air taken to the combustion chamber for engine combustion also increases, and therefore, the exhaust gas pressure Pe of the area Ahp also becomes higher. Here, the determination "NO" in step S120 means that the intake air amount GA is not higher than the intake air amount determining value Gah. Therefore, in the present embodiment, based on this determination of "NO", it is determined that the exhaust gas pressure Pe is relatively low. As it is determined that the exhaust gas pressure Pe is relatively low, increment of counter value Ncnt is prohibited and the counter is reset, as described above.

Further, as the amount of fuel injection Q increases, the combustion pressure increases and the amount of intake air taken to the combustion chamber for engine combustion also increases, and therefore, the exhaust gas pressure Pe of the area Ahp also becomes higher. Here, the determination "NO" in step S130 means that the amount of fuel injection Q is not higher than the fuel injection amount determining value Qh. Therefore, in the present embodiment, based on this determination of "NO", it is determined that the exhaust gas pressure Pe is relatively low. As it is determined that the exhaust gas pressure Pe is relatively low, increment of counter value Ncnt is prohibited and the counter is reset, as described above.

After the execution of process step S160 (counter reset), the present control routine is terminated. On the other hand, after the execution of process step S150 (increment of counter value Ncnt), whether the counter value Ncnt is larger than a predetermined determination value β or not is determined (step S170). Specifically, in step S170, whether the number of consecutive repetition of the state where determinations in steps S110, S120, S130 and S140 are all "YES" exceeded the determination value β or not is determined.

If the result of determination is "YES", it is determined that the state where the exhaust gas pressure Pe is relatively high has been continued over a predetermined time period, and the indication is given on the indicator that the boost pressure changing mechanism 25 is defective. On the contrary, if the determination is "NO", it means that the duration of the state where the exhaust gas pressure Pe is high is insufficient to make a determination of defect, and hence, the indication is not given, and the present control routine is terminated.

In this manner, in the present embodiment, dependent on the state of engine operation as represented by the actual boost pressure Pim, the amount of intake air Ga and amount of fuel injection Q, execution of process step S140 (increment of counter value Ncnt) is permitted or prohibited. Specifically, the manner of defect determination on boost pressure changing mechanism 25 is changed in accordance with the state of engine operation.

Further, in the present embodiment, the determining values described above (boost pressure determining value Pimh, intake air amount determining value Gah, fuel injection amount determining value Qh) are changed in accordance with the state of engine operation, in order to reflect the state of engine operation at the time of executing each of the determining processes of steps S110, S120 and S130, to realize determination more closely based on the actual situation. For instance, in the present embodiment, based on the function map shown in FIG. 3, each determining value is variably set in accordance with the engine speed Ne at the time of execution of each determining process. Each function map is stored in memory 31 of ECU 30 in advance.

By way of example, for the boost pressure determining value Pimh, the function map is set such that the determining value becomes smaller as the engine speed Ne becomes higher. Specifically, when the actual boost pressure Pim is high and engine speed Ne further increases, the flow rate of exhaust gas from engine 10 also increases basically. Consequently, the exhaust gas pressure Pe in area Ahp of exhaust passage 12 also increases accordingly. In other words, when the engine speed Ne increases, the exhaust gas pressure Pe would increase to maximum tolerable pressure Pemax unless the actual boost pressure Pim is decreased.

Therefore, as shown in the function map, the "detection area", in which the actual boost pressure Pim is higher than the boost pressure determining value Pimh is much enlarged to the lower pressure side as the engine speed Ne increases, whereby the accuracy in detecting any defect of boost pressure changing mechanism 25 is improved.

As to the fuel injection amount determining value Qh, the function map is set such that the determining value becomes smaller as the engine speed Ne becomes higher. The function map is set considering the following factors. Specifically, when the amount of fuel injection Q is large and engine speed Ne further increases, the flow rate of exhaust gas from engine 10 also increases basically. Consequently, the exhaust gas pressure Pe in area Ahp of exhaust passage 12 also increases accordingly. In other words, when the engine speed Ne increases, the exhaust gas pressure Pe would increase to maximum tolerable pressure Pemax unless the amount of fuel injection Q is decreased.

Therefore, as shown in the function map, the "detection area", in which the amount of fuel injection Q is larger than the fuel injection amount determining value Qh is much enlarged to the smaller amount side as the engine speed Ne increases, whereby the accuracy in detecting any defect of boost pressure changing mechanism 25 is improved.

As to the intake air amount determining value Gah, the function map is set such that the determining value becomes larger as the engine speed becomes higher. The function map is set considering the following factors. When the amount of intake air Ga is large and the engine speed Ne decreases, the amount of intake air taken to the combustion chamber per one engine combustion increases, and therefore, compression ratio increases. Accordingly, the exhaust gas pressure Pe in area Ahp of exhaust passage 12 also increases. In other words, when the engine speed Ne lowers, the exhaust gas pressure Pe would increase to maximum tolerable pressure Pemax unless the amount of intake air Ga is decreased.

Therefore, as shown in the function map, the "detection area", in which the amount of intake air Ga is larger than the intake air determining value Gah is much enlarged to the smaller amount side as the engine speed Ne decreases, whereby the accuracy in detecting any defect of boost pressure changing mechanism 25 is improved.

In respective function maps, the "mask areas" separated from respective detection areas with the determination curves being the boundary represent the ranges of actual boost pressure Pim, fuel injection amount Q and intake air amount Ga, respectively, in which determination of "NO" is done in steps S110, S120 and S130. Specifically, when the processes of S110, S120 and S130 are executed, the determination that boost pressure determining mechanism 25 is defective is not made if the boost pressure Pim, fuel injection amount Q and intake air amount Ga are within respective mask areas.

Each function map is set, by way of example, in the following manner. First, nozzle open position Na is fixed such that the supercharging degree by boost pressure changing mechanism 25 attains the maximum. Then, while keeping constant the engine speed Ne, the amount of fuel injection Q is increased gradually from the smallest, and the amount of fuel injection Q when the exhaust gas pressure Pe in area Ahp of exhaust passage 121 attains the highest tolerable pressure Pemax is set as the fuel injection amount determining value Qh that corresponds to the engine speed Ne mentioned above, as shown in FIG. 4.

Actual boost pressure Pim and intake air amount Ga increase as the amount of fuel injection Q increases, and therefore, the actual boost pressure Pim and the amount of intake air Ga when the amount of fuel injection Q attains the fuel injection amount determining value Qh are set as the boost pressure determining value Pimh and intake air amount determining value Gah, respectively. Thus, the boost pressure determining value Pimh, fuel injection amount determining value Qh and intake air amount determining value Gah corresponding to the engine speed Ne are set. Such setting is done for different engine speed, and thus, the function maps of FIG. 3 having the engine speed Ne as an independent variable are completed.

Figure 5:
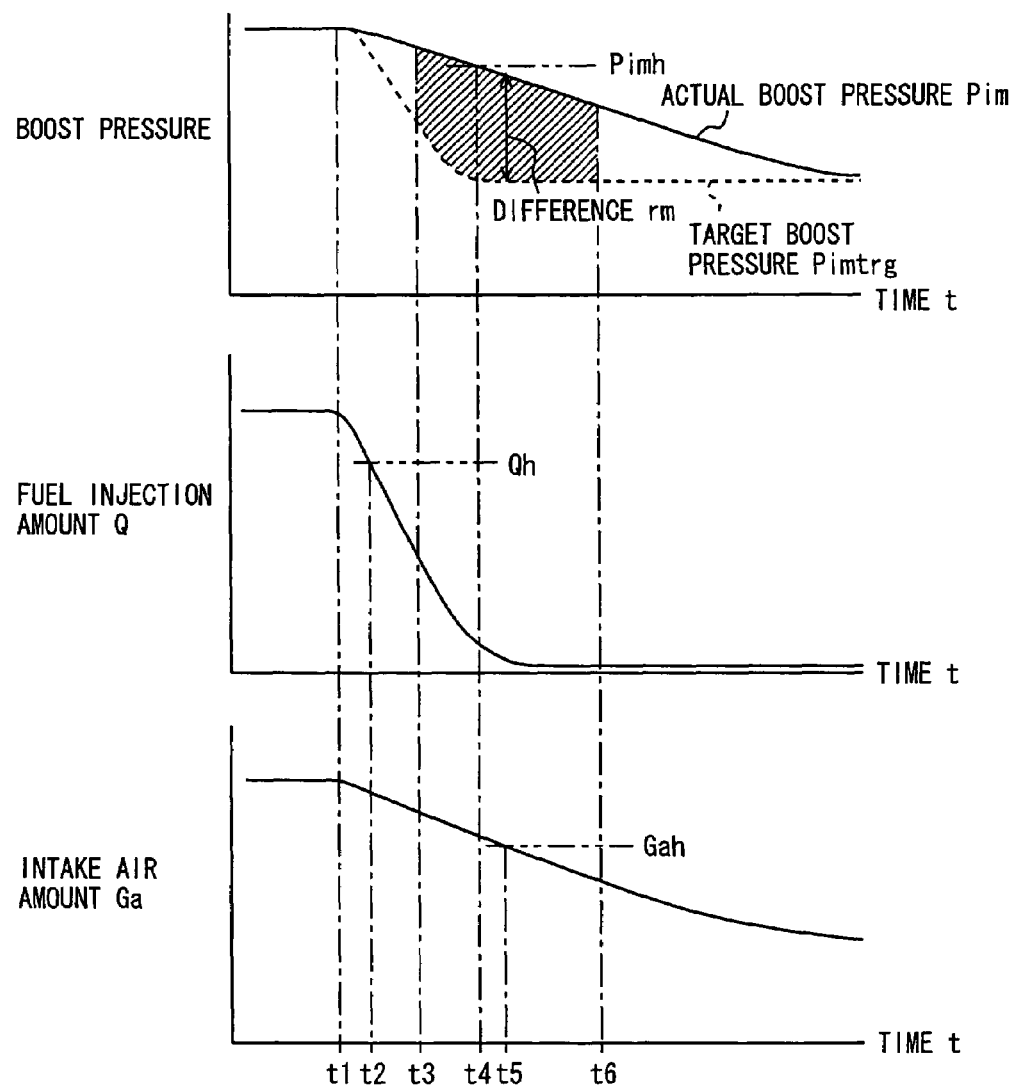
FIG. 5 includes timing charts representing an exemplary manner of control.

FIG. 5 shows an exemplary manner of control when the control routine described above is executed repeatedly. In this example, t1 represents a time point when an accelerator of engine 10 is turned off. In response to this accelerator-off operation, ECU 30 changes target boost pressure Pimtrg such that it decreases quickly, and decreases the amount of fuel injection Q. As the amount of fuel injection Q decreases, the amount of intake air Ga also decreases.

As time passes from time point t1, engine speed Ne also decreases. In the present embodiment, first at time point t2, the amount of fuel injection Q attains to the fuel injection amount determining value Qh corresponding to the engine speed Ne at this time point (goes out from the detection area), and it follows that the determination that boost pressure changing mechanism 25 is defective is not made.

In the present example, it is assumed that the difference (represented as rm in the figure) when the target boost pressure Pimtrg is subtracted from the actual boost pressure Pim is larger than the deviation determining value α in a time period from t3 to t6. Specifically, if steps S110, S120 and S130 were omitted from the control routine described above, the boost pressure changing mechanism 25 would be determined defective and the indication to that effect would be given on the indicator in the period from t3 to t6.

In the present example, the amount of fuel injection Q decreases to be not higher than fuel injection amount determining value Qh at time point t2, the actual boost pressure Pim decreases to be not higher than the boost pressure determining value Pimh at time point t4, and the amount of intake air Ga decreases to be not higher than the intake air amount determining value Gah at time point t5, and among these time points, time point t2 is earlier than the time point t3 described above, and therefore, the indication is not given on the indicator.

In the present embodiment, ECU 30 serves as a defect determining device including a defect determining unit, an exhaust gas pressure determining unit, a changing unit and a storage unit (memory 31).

The present embodiment provides the following effects.

(1) In the present embodiment, the exhaust gas pressure Pe in area Ahp of exhaust passage 12 is estimated based on the state of engine operation, and when the estimated exhaust gas pressure Pe is relatively low, the manner of defect determination is changed to make the determination that boost pressure changing mechanism 25 is defective less likely, even when actual boost pressure Pim is higher than the target boost pressure Pimtrg. Therefore, when the exhaust gas pressure Pe is low and possibility of decrease in durability of components forming exhaust passage 12 is low, the manner of defect determination is changed such that the defect determination is not readily made. When the exhaust gas pressure Pe increases, such a change is not made, and the defect determination is done in a normal manner. Therefore, according to the present embodiment, a defect that the exhaust gas pressure Pe increases excessively because of failure of boost pressure changing mechanism 25 with the supercharging degree being relatively large can be determined immediately while avoiding erroneous determination.

(2) When the actual boost pressure Pim is equal to or lower than the boost pressure determining value Pimh and the actual boost pressure is relatively low, it is determined that the exhaust gas pressure Pe is relatively low. Therefore, according to the present embodiment, the exhaust gas pressure Pe can be estimated with high accuracy, and reliability of the result of defect determination can be improved.

(3) The boost pressure determining value Pimh is set to be smaller as the engine speed Ne becomes higher. Therefore, according to the present embodiment, the exhaust gas pressure Pe can be estimated with high accuracy, and reliability of the result of defect determination can further be improved.

(4) When the amount of fuel injection Q is equal to or lower then the predetermined fuel injection amount determining value Qh and the amount of fuel injection is relatively small, it is determined that the exhaust gas pressure Pe is relatively low. Therefore, according to the present embodiment, the exhaust gas pressure Pe can be estimated with high accuracy, and reliability of the result of defect determination can be improved.

(5) The fuel injection amount determining value Qh is set to be smaller as the engine speed Ne becomes higher. Therefore, according to the present embodiment, the exhaust gas pressure Pe can be estimated with high accuracy, and reliability of the result of defect determination can further be improved.

(6) When the amount of intake air Ga is equal to or lower than the predetermined intake air amount determining value Gah and the amount of intake air Ga is relatively low, it is determined that the exhaust gas pressure Pe is relatively low. Therefore, according to the present embodiment, the exhaust gas pressure Pe can be estimated with high accuracy, and reliability of the result of defect determination can be improved.

(7) The intake air amount determining value Gah is set to be larger as the engine speed Ne becomes higher. Therefore, according to the present embodiment, the exhaust gas pressure Pe can be estimated with high accuracy, and reliability of the result of defect determination can further be improved.

(8) As described above, when boost pressure changing mechanism 25 fails to operate while the supercharging degree is maintained relatively large, the flow and velocity of exhaust gas flowing to turbine wheel 22 increase to be unnecessarily large, and hence, exhaust gas pressure Pe in area Ahp of exhaust passage 12 tends to increase excessively. Therefore, in the present embodiment, relations among of the engine speed Ne, actual boost pressure Pim, amount of fuel injection Q and amount of intake air Ga when the supercharging degree attained by boost pressure changing mechanism 25 is fixed at the maximum are stored beforehand as function maps such as those described above, and the state where the exhaust gas pressure Pe is relatively low is determined based on the relations and the engine speed Ne. Therefore, according to the present embodiment, whether the state where exhaust gas pressure Pe increases excessively when boost pressure changing mechanism 25 fails to operate with the supercharging degree attained by the mechanism being relatively large occurs or not is determined, and if it is not the case and the exhaust gas pressure Pe is relatively low, the manner of defect determination is changed such that the defect determination is not readily made. As a result, erroneous determination of defect on turbo charger 20 can appropriately be avoided.

(9) In the present embodiment, when any of the conditions that the actual boost pressure Pim is equal to or lower than the boost pressure determining value Pimh, the amount of fuel injection Q is equal to or lower than the fuel injection amount determining value Qh, and the amount of intake air Ga is equal to or lower than the intake air amount determining value Gah is satisfied, it is determined that the exhaust gas pressure Pe is relatively low. As compared with a manner in which determination that exhaust gas pressure Pe is relatively low is made only when two or more of these conditions are satisfied, the determination that the exhaust gas pressure Pe is relatively low is made more easily, and hence, erroneous determination described above becomes less likely.

(10) In the present embodiment, when the exhaust gas pressure Pe is determined to be relatively low, the determination that boost pressure changing mechanism 25 is defective is prohibited. Therefore, as compared with a manner in which the defect determination mentioned above is made less likely in the range where such prohibition does not take place, the erroneous determination mentioned above can more immediately be avoided.

The embodiment described above is not limiting, and the following implementations are also possible.

In the embodiment above, the boost pressure determining value Pimh is set to be smaller as the engine speed Ne becomes higher. It is not limiting, and when the engine speed Ne is high, a boost pressure determining value Pimh that is equal to or higher than when the engine speed is low may be set.

In the embodiment above, the fuel injection amount determining value Qh is set to be smaller as the engine speed Ne becomes higher. It is not limiting, and when the engine speed Ne is high, a fuel injection amount determining value Qh that is equal to or higher than when the engine speed is low may be set.

In the embodiment above, the intake air amount determining value Gah is set to be larger as the engine speed Ne becomes higher. It is not limiting, and when the engine speed Ne is high, an intake air amount determining value Gah that is equal to or lower than when the engine speed is low may be set.

In the embodiment above, function maps having the engine speed Ne as an independent variable are adopted for setting the boost pressure determining value Pimh, fuel injection amount determining value Qh and intake air amount determining value Gah. It is not limiting, and function maps having a different characteristic related to the state of engine operation as the independent variable may be adopted.

In the embodiment above, the boost pressure determining value Pimh, fuel injection amount determining value Qh and intake air amount determining value Gah are variably set in accordance with the state of engine operation. It is not limiting, and these values may be fixed.

In the embodiment above, the manner of determination is changed such that when the exhaust gas pressure Pe is determined to be relatively low, determination that boost pressure changing mechanism 25 is defective is prohibited. Such prohibition, however, is not necessary. In place of such a change in the manner of determination, the manner may be changed as follows. Specifically, when it is determined that the exhaust gas pressure Pe is relatively low, the defect determination based on the degree of deviation between the target boost pressure Pimtrg and the actual boost pressure Pim described above is done, while the deviation determining value at this time is set to be larger than the deviation determining value α described above, so that the defect determination is not readily made.

In the embodiment above, when any of the conditions that the actual boost pressure Pim is equal to or lower than the boost pressure determining value Pimh, the amount of fuel injection Q is equal to or lower than the fuel injection amount determining value Qh, and the amount of intake air Ga is equal to or lower than the intake air amount determining value Gah is satisfied, it is determined that the exhaust gas pressure Pe is relatively low. It is not limiting and, by way of example, when at least two of these conditions are satisfied, it may determined that the exhaust gas pressure Pe is relatively low. In that case, for example, the determination may be made when two of the conditions, that is, the actual boost pressure Pim is equal to or lower than the boost pressure determining value Pimh, and the amount of fuel injection Q is equal to or lower than the fuel injection amount determining value Qh, are satisfied. Alternatively, the determination may be made when two of the conditions, that is, the actual boost pressure Pim is equal to or lower than the boost pressure determining value Pimh, and the amount of intake air Ga is equal to or lower than the intake air amount determining value Gah, are satisfied. Alternatively, the determination may be made when two of the conditions, that is, the amount of fuel injection Q is equal to or lower than the fuel injection amount determining value Qh, and the amount of intake air Ga is equal to or lower than the intake air amount determining value Gah, are satisfied. Alternatively, the determination may be made when all three of the conditions are satisfied. Along with the variation of conditions, the reference for determining degree of deviation between the target boost pressure Pimtrg and the actual boost pressure Pim (such as the deviation determining value α) and the reference for determining counter value Ncnt (such as determination value β) may be changed.

In the embodiment above, the number of conditions for determining that the exhaust gas pressure Pe is relatively low is set to three or more, including conditions that the actual boost pressure Pim is equal to or lower than the boost pressure determining value Pimh, the amount of fuel injection Q is equal to or lower than the fuel injection amount determining value Qh, and the amount of intake air Ga is equal to or lower than the intake air amount determining value Gah. It is not limiting and the number of conditions may be reduced to two or less. By way of example, only two conditions that the actual boost pressure Pim is equal to or lower than the boost pressure determining value Pimh and the amount of fuel injection Q is equal to or lower than the fuel injection amount determining value Qh may be adopted, or two conditions that the actual boost pressure Pim is equal to or lower than the boost pressure determining value Pimh and the amount of intake air Ga is equal to or lower than the intake air amount determining value Gah may be adopted. Alternatively, two conditions that the amount of fuel injection Q is equal to or lower than the fuel injection amount determining value Qh and the amount of intake air Ga is equal to or lower than the intake air amount determining value Gah may be adopted. Alternatively, only one of the three conditions above may be adopted. Alternatively, four or more conditions including the three conditions above may be provided as possible choices, and one or two of the conditions may be adopted. Further, in accordance with the different conditions, the reference for determining degree of deviation between the target boost pressure Pimtrg and the actual boost pressure Pim (such as the deviation determining value $\alpha$) and the reference for determining counter value Ncnt (such as determination value $\beta$) may be changed.

In the embodiment above, when the determination that the exhaust gas pressure Pe is relatively low is continued for a predetermined time period, it is determined that boost pressure setting mechanism 25 is defective. This is not limiting and, by way of example, the processes of steps S150, S160 and S170 may be omitted, so that the defect determination may be made without considering the continuation for the predetermined time period.

By way of example, one or more conditions may be added to the three conditions that the actual boost pressure Pim is equal to or lower than the boost pressure determining value Pimh, the amount of fuel injection Q is equal to or lower than the fuel injection amount determining value Qh, and the amount of intake air Ga is equal to or lower than the intake air amount determining value Gah, and when one of the four or more conditions is satisfied, it may be determined that the exhaust gas pressure Pe is relatively low. Alternatively, when two or more of the four or more conditions are satisfied, it may be determined that the exhaust gas pressure Pe is relatively low. Further, in accordance with the different conditions, the reference for determining degree of deviation between the target boost pressure Pimtrg and the actual boost pressure Pim (such as the deviation determining value $\alpha$) and the reference for determining counter value Ncnt (such as determination value $\beta$) may be changed.

By way of example, the reference for determining degree of deviation between the target boost pressure Pimtrg and the actual boost pressure Pim (such as the deviation determining value $\alpha$) and the reference for determining counter value Ncnt (such as determination value $\beta$) may be changed in accordance with the state of engine operation. In that case, for variable setting of references, it is desirable to prepare dedicated function map or maps and to set the references accordingly.

Though the difference between the actual boost pressure Pim and the target boost pressure Pimtrg is used as an index representing the degree of deviation between the target boost pressure Pimtrg and the actual boost pressure Pim in the embodiment above, it is not limiting and other index may be used. By way of example, a value obtained by dividing the actual boost pressure Pim by the target boost pressure Pimtrg may be used.

The present invention may be applied to a defect determining device of a turbo charger of, for example, gasoline internal combustion engine, other than the diesel engine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A defect determining device for determining a defect of a turbo charger including a boost pressure changing mechanism allowing change in boost pressure in accordance with a state of operation of an internal combustion engine, comprising:

a defect determining unit determining a defect of excessive increase in exhaust gas pressure in an exhaust passage from said internal combustion engine to said turbo charger based on a degree of deviation between a target boost pressure and an actual boost pressure of said turbo charger;

an engine state of operation acquirement unit sensing or calculating the state of operation of the engine;

an exhaust gas pressure determining unit determining that said exhaust gas pressure is within a tolerable range of exhaust gas pressure based on an acquired state of operation of the engine; and a changing unit changing a manner of the defect determination such that the determination of defect is not readily made when the exhaust gas pressure is determined to be within said tolerable range by the exhaust gas pressure determining unit.

2. The defect determining device for a turbo charger according to claim 1, wherein the state of operation sensed or calculated by the engine state of operation acquirement unit is the actual boost pressure, and wherein said exhaust gas pressure determining unit determines that said exhaust gas pressure is within said tolerable range when the actual boost pressure is equal to or lower than a predetermined boost pressure value, and wherein said predetermined boost pressure value is a value separate from said target boost pressure.

3. The defect determining device for a turbo charger according to claim 2, wherein said predetermined boost pressure value varies with engine speed, and said exhaust gas pressure determining unit sets said predetermined boost pressure value to be smaller when engine speed is higher.

4. The defect determining device for a turbo charger according to claim 1, wherein the state of operation sensed or calculated by the engine state of operation acquirement unit is an amount of fuel injection, and wherein said exhaust gas pressure determining unit determines that said exhaust gas pressure is within said tolerable range when the amount of fuel injection is equal to or lower than a predetermined fuel injection amount value.

5. The defect determining device for a turbo charger according to claim 4, wherein said predetermined fuel injection amount value varies with engine speed, and said exhaust gas pressure determining unit sets said predetermined fuel injection amount value to be smaller when engine speed is higher.

6. The defect determining device for a turbo charger according to claim 1, wherein the state of operation sensed or calculated by the engine state of operation acquirement unit is an amount of intake air, and wherein said exhaust gas pressure determining unit determines that said exhaust gas pressure is within said tolerable range when the amount of intake air is equal to or lower than a predetermined intake air amount value.

7. The defect determining device for a turbo charger according to claim 6, wherein said predetermined intake air amount value varies with engine speed, and said exhaust gas pressure determining unit sets said predetermined intake air amount value to be larger when engine speed is higher.

8. The defect determining device for a turbo charger according to claim 1, wherein
said exhaust gas pressure determining unit includes a storage unit storing relationships among an engine speed, the actual boost pressure, an amount of fuel injection and an amount of intake air when a degree of supercharging attained by said boost pressure changing mechanism is fixed at a maximum amount, and determines that the exhaust gas pressure is within said tolerable range based on said relationships for an actual engine speed.

9. The defect determining device for a turbo charger according to claim 8, wherein
said storage unit stores functions for calculating a predetermined boost pressure value, a predetermined fuel injection amount value and a predetermined intake air amount value, respectively, for different engine speeds;
the state of operation acquirement unit senses or calculates the actual boost pressure, an amount of fuel injection, and an amount of intake air; and
said exhaust gas pressure determining unit determines that said exhaust gas pressure is within said tolerable range, when at least one of the following conditions is satisfied for an actual engine speed: (a) the actual boost pressure is equal to or lower than said predetermined boost pressure value, (b) the amount of fuel injection is equal to or lower than said predetermined fuel injection amount value, or (c) the amount of intake air is equal to or lower than said predetermined intake air amount value.

10. The defect determining device for a turbo charger according to claim 9, wherein
said predetermined boost pressure value is set to be smaller when the engine speed is higher.

11. The defect determining device for a turbo charger according to claim 9, wherein
said predetermined fuel injection amount value is set to be smaller when the engine speed is higher.

12. The defect determining device for a turbo charger according to claim 9, wherein
said predetermined intake air amount value is set to be larger when the engine speed is higher.

13. The defect determining device for a turbo charger according to any of claims 1 to 12, wherein
said changing unit prohibits said defect determining unit from making a determination of defect, when said exhaust gas pressure determining unit determines that the exhaust gas pressure is within said tolerable range.

14. A defect determining device according to claim 1, wherein the device includes a counter to determine an amount of time a deviation between the target boost pressure and the actual boost pressure has occurred, and wherein said defect determining device determines that the turbo charger is defective when said counter indicates a predetermined amount of time has been exceeded, and further wherein said changing unit resets said counter in response to the determination by said exhaust gas pressure determining unit that said exhaust gas pressure is within said tolerable range.

15. A defect determining device according to claim 14, wherein said exhaust pressure determining device compares at least one of: (a) an actual boost pressure value with a predetermined boost pressure value, (b) an actual intake air value with a predetermined intake air value, or (c) an actual fuel injection value with a predetermined fuel injection value; and
wherein said exhaust pressure determining unit determines exhaust pressure is within said tolerable range at least when an actual value of (a)-(c) is lower than a respective predetermined value of (a)-(c).

16. A defect determining device according to claim 15, wherein the state of operation acquirement unit senses or calculates the actual boost pressure, an amount of fuel injection, and an amount of intake air;
wherein the exhaust pressure determining device compares each of said actual boost pressure value, said actual intake air value, and said actual fuel injection value, respectively with, said predetermined boost pressure value, said predetermined intake air value, and said predetermined fuel injection value; and
wherein said exhaust pressure determining unit determines exhaust pressure is within said tolerable range at least when any one of the actual values is lower than the respective predetermined value.

17. A defect determining device according to claim 16, wherein each of the respective predetermined values is varied based on engine speed.

18. A defect determining device according to claim 15, wherein the predetermined value is varied based on engine speed.

19. A defect determining device according to claim 15, wherein the exhaust pressure determining unit determines exhaust pressure is within said tolerable range when the actual value is equal to or less than the predetermined value.

20. A defect determining device according to claim 1, wherein said exhaust pressure determining device compares at least one of: (a) an actual boost pressure value with a predetermined boost pressure value, (b) an actual intake air value with a predetermined intake air value, or (c) an actual fuel injection value with a predetermined fuel injection value; and
wherein said exhaust pressure determining unit determines exhaust pressure is within said tolerable range at least when an actual value of (a)-(c) is lower than a respective predetermined value of (a)-(c).

21. A defect determining device according to claim 20, wherein the state of operation acquirement unit senses or calculates the actual boost pressure, an amount of fuel injection, and an amount of intake air;
wherein the exhaust pressure determining device compares each of said actual boost pressure value, said actual intake air value, and said actual fuel injection value, respectively with, said predetermined boost pressure value, said predetermined intake air value, and said predetermined fuel injection value; and
wherein said exhaust pressure determining unit determines exhaust pressure is within said tolerable range at least when any one of the actual values is lower than the respective predetermined value.

22. A defect determining device according to claim 21, wherein each of the respective predetermined values is varied based on engine speed.

23. A defect determining device for determining a defect of a turbo charger including a boost pressure changing mechanism allowing change in boost pressure in accordance with a state of operation of an internal combustion engine, comprising:
a defect determining unit which, based on a comparison between a target boost pressure and an actual boost pressure, makes a determination that the turbo charger is defective;
an exhaust pressure determining unit which compares an actual value relating to a state of operation of the engine with a predetermined value, and which makes a determination that exhaust pressure is within a tolerable range at least when said actual value is lower than said predetermined value, and wherein said predetermined value is a separate value from said target boost pressure; and a changing unit which changes operation of said defect determining unit such that the determination that the turbo charger is defective is not readily made when said exhaust pressure is determined to be within said tolerable range by said exhaust pressure determining unit.

24. A defect determining device according to claim 23, wherein said exhaust pressure determining unit compares at least one of: (a) an actual boost pressure value with a predetermined boost pressure value, (b) an actual intake air value with a predetermined intake air value, or (c) an actual fuel injection value with a predetermined fuel injection value; and wherein said exhaust pressure determining unit determines exhaust pressure is within said tolerable range at least when an actual value of (a)-(c) is lower than a respective predetermined value of (a)-(c).

25. A defect determining device according to claim 24, wherein the exhaust pressure determining unit compares each of said actual boost pressure value, said actual intake air value, and said actual fuel injection value, respectively with, said predetermined boost pressure value, said predetermined intake air value, and said predetermined fuel injection value; and wherein said exhaust pressure determining unit determines exhaust pressure is within said tolerable range at least when any one of the actual values is lower than the respective predetermined value.

26. A defect determining device according to claim 25, wherein each of the respective predetermined values is varied based on engine speed.

27. A defect determining device according to claim 24, wherein the device includes a counter to determine an amount of time a deviation between the target boost pressure and actual boost pressure has occurred, and wherein said defect determining device makes a determination that the turbo charger is defective when said counter indicates a predetermined amount of time has been exceeded, and further wherein said changing unit resets said counter in response to said determination that said exhaust gas pressure is within said tolerable range.

28. A defect determining device according to claim 23, wherein the device includes a counter to determine an amount of time a deviation between the target boost pressure and actual boost pressure has occurred, and wherein said defect determining device makes a determination that the turbo charger is defective when said counter indicates a predetermined amount of time has been exceeded, and further wherein said changing unit resets said counter in response to said determination that said exhaust gas pressure is within said tolerable range.

29. A defect determining device according to claim 23, wherein the exhaust pressure determining unit determines exhaust pressure is within said tolerable range when the actual value is equal to or less than the predetermined value.

* * * * *